(12) United States Patent
Carlemalm (10) Patent No.: US 11,863,548 B2
(45) Date of Patent: Jan. 2, 2024

(54) GENERATION AND VERIFICATION OF A TEMPORARY AUTHENTICATION VALUE FOR USE IN A SECURE TRANSMISSION

(71) Applicant: No Common Payment AB, Stockholm (SE)

(72) Inventor: Fredrik Carlemalm, Stockholm (SE)

(73) Assignee: No Common Payment AB, Stockholm (SE)

( * ) Notice: Subject to any disclaimer, the term of this patent is extended or adjusted under 35 U.S.C. 154(b) by 0 days.

(21) Appl. No.: 17/754,140

(22) PCT Filed: Sep. 24, 2020

(86) PCT No.: PCT/SE2020/050900
§ 371 (c)(1),
(2) Date: Mar. 24, 2022

(87) PCT Pub. No.: WO2021/061042
PCT Pub. Date: Apr. 1, 2021

(65) Prior Publication Data
US 2022/0294779 A1 Sep. 15, 2022

(30) Foreign Application Priority Data
Sep. 27, 2019 (SE) .................................. 1951093-2

(51) Int. Cl.
*H04L 9/40* (2022.01)
(52) U.S. Cl.
CPC ................ *H04L 63/0838* (2013.01)
(58) Field of Classification Search
CPC .. H04L 63/0838; H04L 63/083; H04L 9/3226
See application file for complete search history.

(56) References Cited

U.S. PATENT DOCUMENTS 6,959,394 B1 * 10/2005 Brickell ............. G06Q 20/3829
726/19
7,743,200 B1 6/2010 Panwar et al.
(Continued)

FOREIGN PATENT DOCUMENTS

CN 109391474 A 2/2019
EP 2026266 2/2009
(Continued)

OTHER PUBLICATIONS

International Search Report and Written Opinion issued in corresponding PCT Application No. PCT/EP2019/066274 dated Oct. 22, 2019.
(Continued)

*Primary Examiner* — Nelson S. Giddins
(74) *Attorney, Agent, or Firm* — Knobbe Martens Olson & Bear LLP (57) ABSTRACT

The present disclosure inter alia presents a method of generating a temporary authentication value, for use in a secure transmission to a service provider system having one or several computer servers. The method starts with receiving a first identification data and receiving a security data associated with the first identification data. Thereafter, a hash function is applied to the first identification data and the security data to generate a temporary authentication value. The generated temporary authentication value is divided into a first and a second part. The method thereafter comprises transmitting only the second part of the divided temporary authentication value to the service provider system for verification.

23 Claims, 6 Drawing Sheets

(56) References Cited

U.S. PATENT DOCUMENTS

| | | |
|---|---|---|
| 8,364,594 B2 | 1/2013 | Hammand |
| 9,033,218 B1 | 5/2015 | Batra |
| 9,183,480 B1 | 11/2015 | Quigley |
| 10,438,198 B1 | 10/2019 | Griffin et al. |
| 10,523,664 B2 | 12/2019 | Li |
| 11,216,817 B2 | 1/2022 | Carlemalm |
| 2003/0191945 A1 | 10/2003 | Keech |
| 2007/0160198 A1 | 7/2007 | Orsini et al. |
| 2008/0029593 A1 | 2/2008 | Hammad et al. |
| 2008/0077798 A1 | 3/2008 | Nachtigall |
| 2010/0266120 A1 | 10/2010 | Leggette et al. |
| 2011/0270757 A1 | 11/2011 | Hammad |
| 2012/0031969 A1 | 2/2012 | Hammad |
| 2012/0143754 A1 | 6/2012 | Narendra |
| 2012/0143768 A1 | 6/2012 | Hammad et al. |
| 2012/0191615 A1 | 7/2012 | Schibuk |
| 2013/0008956 A1 | 1/2013 | Ashfield |
| 2013/0036027 A1 | 2/2013 | Walker et al. |
| 2013/0103591 A1 | 4/2013 | Wheeler |
| 2014/0040139 A1 | 2/2014 | Brudnicki |
| 2014/0067683 A1 | 3/2014 | Varadarajan |
| 2014/0358777 A1 | 12/2014 | Gueh |
| 2015/0169467 A1 | 6/2015 | Chase et al. |
| 2015/0371234 A1 | 12/2015 | Huang |
| 2016/0180343 A1 | 6/2016 | Poon |
| 2017/0004506 A1 | 1/2017 | Steinman et al. |
| 2017/0195118 A1* | 7/2017 | Perretta .............. G06F 21/575 |
| 2019/0260597 A1 | 8/2019 | Michaud et al. |
| 2020/0128002 A1* | 4/2020 | Khanna ................ H04L 9/3228 |
| 2021/0295323 A1* | 9/2021 | Carlemalm .......... G06Q 20/385 |

FOREIGN PATENT DOCUMENTS

| | | |
|---|---|---|
| JP | 2011-248778 A | 12/2011 |
| WO | WO 2007/076476 A2 | 7/2007 |
| WO | WO 2009/039600 | 4/2009 |
| WO | WO 2015/126753 | 8/2015 |
| WO | WO 2018/044221 | 3/2018 |

OTHER PUBLICATIONS

International Search Report for PCT/SE2017/050858 dated Nov. 24, 2017.
Supplementary European Search Report for Europe Application No. EP 17 84 7093 dated Dec. 17, 2019.
Office Action dated Mar. 30, 2021 issued in Swedish Patent Application No. 1951093-2.
Office Action dated Oct. 4, 2022 issued in Swedish Patent Application No. 1951093-2.
S. Golovashych, "The Technology of Identification and Authentication of Financial Transactions. From Smart Cards to NFC-Terminals," 2005 IEEE Intelligent Data Acquisition and Advanced Computing Systems: Technology and Applications, 2005, pp. 407-412, doi: 10.1109/IDAACS.2005.283013. (Year: 2005).
Bothelho, F.C. et al., "Perfect hashing for Data management Applications" Feb. 2007, UFMG—ICEX, Daprtamento De Ciencia Da Computacao, Universidade Federal De Minas Gerais, RT.DCC.002/2007.
Reis, Davi de Castro et al., "CMPH—C Minimal Perfect Hashing Library" Updated 2012, available online at http://cmph.sourceforge.net/, retrieved Nov. 3, 2022.
Belazzougui, Djamal et al., "Hash, displace, and compress" In: Fiat, A., Sanders, P. (eds) Algorithms—ESA 2009. ESA 2009. Lecture Notes in Computer Science, vol. 5757. Springer, Berlin, Heidelberg. https://doi.org/10.1007/978-3-642-04128-0_61.
Swedish Search Report dated May 14, 2020 issued in Swedish Patent Application No. 1951093-2.
International Search Report dated Feb. 24, 2021 issued in PCT Application No. PCT/SE2020/050900.

* cited by examiner

GENERATION AND VERIFICATION OF A TEMPORARY AUTHENTICATION VALUE FOR USE IN A SECURE TRANSMISSION

TECHNICAL FIELD

The present disclosure generally relates to the field of secure transmissions.

More specifically, the embodiments described herein relate to methods, terminals and computer program for generating a temporary authentication value for use in a secure transmission, e.g., with a service provider system.

BACKGROUND

When a user wants to get access to an account with restricted availability, such as e.g. a bank account or a user account, the user normally has to perform an authentication process. Access to the account is typically handled by a service provider system, which additionally also may be the system that provides the account. The authentication process verifies that the user is the one the user claims to be and that the user is entitled to access the account. The user may be a physical individual or a non-physical one, e.g. a service account in a network of computers.

Normally, the authentication process starts with the user providing identification data to inform the service provider system about who the user is and to identify himself. Thereafter, or at the same time as the identification data is provided, the user will provide some kind of secret, or security data, associated with the identification data to prove to the system that the user really is the user associated with the identification data and thus, that the user is the one that the user claims to be. The service provider system may then verify that the provided secret really is associated with the user and if so, the user may be authenticated to get access to the account. Examples of information that a user may provide to be authenticated may be, for example, a user name and a password, or a card number and a PIN code.

Normally, these authentication processes are performed with a service provider system that is located remote from the user. Then, the authentication processes are typically performed through a network or other connection, for example via the Internet. However, if this data is provided to the service provider system in plain text, there is a risk of an eavesdropper registering the provided data and then using it for its own purposes later on.

SUMMARY

There have been provided many solutions of how to transmit, from the user to the system that verifies the user, information that authenticates a user. However, as also discussed in the background, this disclosure recognizes that many of these solutions have drawbacks. Some of these solutions do not provide enough security, e.g. the information is transmitted in plain text and is easy for a man-in-the-middle to eavesdrop upon. Other solutions are secure enough, but are too complicated and/or expensive to implement, e.g. advanced encryption schemes where keys have to be exchanged beforehand. It is therefore a general object of the embodiments described herein to further develop the technology that is known in the existing art.

It is therefore in view of the above background that the various embodiments disclosed herein have been made.

It is a general object of the embodiments described herein to provide a solution for authenticating a user in a non-complex, but still secure, way.

This general object has been addressed by the appended independent claims. Advantageous embodiments are defined in the appended dependent claims.

In a first of its aspects, this disclosure concerns a method of generating a temporary authentication value, for use in a secure transmission to a service provider system having one or several computer servers. The method comprises receiving a first identification data and receiving a security data associated with the first identification data. The method further comprises applying a hash function to the first identification data and the security data to generate a temporary authentication value and dividing the generated temporary authentication value into a first and a second part. The method further comprises transmitting only the second part of the divided temporary authentication value to the service provider system.

In some embodiments, the hash function is a Minimal Perfect Hash (MPH) function.

In some embodiments, the first identification data is a card number. The security data may then be a PIN code. In other embodiments, the first identification data is a user name. The security data may then be a password.

In some embodiments, the first and the second part of the divided temporary authentication value are of equal size. In other embodiments, the first and the second part of the divided temporary authentication value are of different sizes. The second part may be smaller than the first part of the divided temporary authentication value. Alternatively, the first part of the divided temporary authentication value may be smaller than the second part.

In some embodiments, the method is performed by a terminal and the terminal is a device selected from the group consisting of: a mobile telephone, a tablet computer, a laptop computer, a desktop computer, card terminal and an Automatic Teller Machine (ATM).

In a second of its aspects, this disclosure concerns a method of verifying a second part of a temporary authentication value used in a secure transmission. The method comprises receiving the second part of the temporary authentication value. The second part of the divided temporary authentication value has been generated by previously applying a hash function to a first identification data and a security data to generate a temporary authentication value. The temporary authentication value has been divided into a first and a second part. The method further comprises comparing the received second part of the temporary authentication value with each one of at least one available authentication value until a match is found between the received second part of the temporary authentication value and one authentication value.

In some embodiments, the at least one authentication value is stored in a list of available authentication values.

In some embodiments, the method further comprises obtaining a second identification data. The second identification data is a same identification data as the first identification data. The method further comprises applying a same hash function to the obtained second identification data together with each one of several security data from a stored list of available security data to generate an initial authentication value. The method further comprises dividing each generated initial authentication value into a first and a second part. Each second part of the generated initial authentication values correspond to an available authentication value. In some embodiments, the method further comprises storing the available authentication value as authentication values in a list of available authentication values.

In some embodiment, the method further comprises, in response to a match having been found, continuing with an action initiated by the verified secure transmission.

In some embodiments, the hash function is a Minimal Perfect Hash (MPH) function.

In advantageous embodiments, the method is performed by a service provider system having one or several computer servers.

In a third of its aspects, this disclosure concerns a computer program comprising instructions which, when executed on a processor, causes the processor to carry out the method according to the first aspect or the second aspect. A carrier comprising the computer program according to third aspect may also be provided. The carrier may be one of an electronic signal, an optical signal, a radio signal, or a computer readable storage medium.

In a fourth of its aspects, this disclosure concerns a terminal comprising a user interface; a communications interface; one or more processors; and a memory storing instructions, executable by the one or more processors, whereby the terminal is operative to perform the method according to the first aspect. The terminal may be a device selected from the group consisting of: a mobile telephone, a tablet computer, a laptop computer, a desktop computer, card terminal, and an ATM.

In a fifth of its aspects, this disclosure concerns a service provider system having one or several computer servers. The service provider system comprises a communications interface; one or more processors; and a memory storing instructions, executable by the one or more processors, whereby the service provider system is operative to perform the method according to the third aspect.

In a sixth of its aspects, this disclosure concerns a method for a secure transmission between a terminal and a service provider system having one or several computer servers. The method comprises the terminal receiving a first identification data; and the terminal receiving a security data associated with the identification data. The method further comprises the terminal applying a hash function to the identification data and the security data to generate a temporary authentication value; and the terminal dividing the generated temporary authentication value into a first and a second part. Thereafter, the method comprises the terminal transmitting the second part of the divided temporary authentication value to the service provider system. The method further comprises the service provider system receiving said second part of the divided temporary authentication value; and the service provider system comparing the received second part of the temporary authentication value with each one of at least one available authentication value until a match is found between the received second part of the temporary authentication value and one authentication value.

In an seventh of its aspects, this disclosure concerns a system for a secure transaction. The system comprises a terminal and a service provider system having one or several computer servers. The terminal is adapted to receive a first identification data; to receive a security data associated with the first identification data; and to apply a hash function to the first identification data and the security data to generate a temporary authentication value. The terminal is further adapted to divide the generated temporary authentication value into a first and a second part; and to transmit the second part of the divided temporary authentication value to the service provider system. The service provider system is adapted to receive the second part of the temporary authentication value; and to compare the received second part of the temporary authentication value with each one of at least one available authentication value until a match is found between the received second part of the temporary authentication value and one authentication value.

As will be appreciated, some embodiments described herein enable secure transmissions and verifications of authentication values by transmitting a second half of a temporary authentication value from a terminal to a service provider system having one or several computer servers. The present disclosure is secure enough but without requiring complicated encryption algorithms or security systems.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout this description.

As described earlier, some existing solutions for secure transmissions of authentication data may not be secure enough or may be complex and/or expensive to implement. A general object of the embodiments described herein is to allow for a more secure transmission of information that offers prevention, or at least complication, of unauthorized use of accounts by limiting access to accounts to unauthorized entities, processes and/or individuals.

To address this, in accordance with an example embodiment, methods and a system for secure transmissions and verifications of authentication values between a terminal and a service provider system are described herein. For example, the terminal may receive a first identification data and receive a security data associated with the first identification data. Furthermore, the terminal may apply a hash function to the first identification data and the security data to generate a temporary authentication value and the terminal may divide the generated temporary authentication value into a first and a second part. Thereafter, the terminal may transmit only the second part of the divided temporary authentication value to the service provider system. Moreover, the service provider system may receive the second part of the temporary authentication value and compare the received second part of the temporary authentication value with each one of at least one available authentication value until a match is found between the received second part of the temporary authentication value and one authentication value.

In response to a match having been found, the service provider system may then provide the terminal access to an account associated with the first identification data.

This may enable the generation of a second half of a temporary authentication value, which authenticates a terminal associated with the first identification data. The generated temporary authentication value is generally uniquely associated with the original security data, which in turn is associated with the first identification data. Compared to the original security data, the temporary authentication value is therefore comparatively more difficult to obtain fraudulently. For example, if a transmission of the security data is performed unencrypted between a terminal and a service provider, an eavesdropper could easily obtain the security data and use it for its own purposes.

However, the generated temporary authentication value according to the present disclosure is divided into two parts and it is only the second part of the generated authentication value that is transmitted from the terminal to the server system. A part of the temporary authentication value is not uniquely associated with the original security data. In fact, several security data may be associated with the second part of the temporary authentication value. Nevertheless, even if more than one security data may be associated with the second part of the temporary authentication value, the provided security is still sufficiently high. The numbers of security data associated with the second part of the temporary authentication value is still lower than the total amount of possible security data. For example, if the security data comprises four digits, there are 10,000 possible combinations of the digits. When the temporary authentication value is divided into two parts, the second part may comprise, for example, two digits. Thus, the two last digits for 100 of the 10,000 possible combinations of the temporary authentication values may match the second part of the temporary authentication value. The percentage of matching security data will of course depend on the size of the second part of the authentication value compared to the size of the entire temporary authentication value. The smaller the second part of the authentication value is compared to the total size, the more matching values.

There are several advantages of dividing the temporary authentication value in two parts and only transmitting the second part. First and foremost, by dividing the temporary authentication value in two parts, it does not matter if the man-in-the-middle is eavesdropping. It does not matter if the man-in-the-middle is eavesdropping even if he is a network owner who has unencrypted access to the received second part of the temporary authentication value or if he is a third party responsible for verifying that the user is entitled to access his account, make a credit card payment using PIN code verification, etc. Even if the man-in-the-middle knows the hash function and its parameters, as well as the user identification data, the man-in-the-middle will not be able to extract the security data that is the origin of the transmitted second half of the temporary authentication value. In the case of a typical four-digit PIN code, there would typically and literally be a hundred possible security data values, i.e. PIN codes, to choose between.

Secondly, the present disclosure enables more secure off-line verification, as there is less risk having a third party misusing authentication value lists and corresponding algorithms. Thus, off-line credit card payment using PIN code verification may be more secure. For example, an ATM, which is temporarily off-line, could still verify the user at a secure enough level.

Thirdly, the verification at the service provider system is easier to perform. For example, it may be less complex to verify a string comprising of two digits than of four. Furthermore, by transmitting and verifying a smaller part than the entire temporary authentication value, less data need to be handled and the security value comparison lists may be significantly shortened, typically to the square root of the original length (e.g. with 100 instead of 10,000 values). This may make the verification to be performed quicker.

It might be argued that the verification according to the present disclosure is less secure than if the entire temporary authentication value is transmitted. Instead of 10,000 possible PIN code combinations, there might instead be only 100 possible combinations. However, especially if there is a non-permanent situation, as with an ATM temporarily off-line, or if a middle-man does not dare exposing himself, testing 50 faulty credit card PIN codes before finding the correct one, the risk may be deemed moderate.

Accordingly, the advantages of dividing the temporary authentication value into two parts outweigh the disadvantages associating the temporary authentication value with several security data.

Prior to describing the embodiments of the present disclosure in more detail, and to give context to these embodiments, hash functions will be described briefly. A hash function is any function that can be used to map data of arbitrary size to data of fixed size. The values returned by a hash function are typically called hash values, hash codes, hash sums, or simply hashes. The earlier-mentioned "temporary authentication value" could thus be seen as a hash value. One use is a data structure called a hash table, widely used in computer technology for rapid data lookup. Hash functions typically accelerate table or database lookup by detecting duplicated records in a large file. A hash function may allow one to easily verify that some input data maps to a given hash value, but if the input data is unknown, it is deliberately difficult to reconstruct it (or equivalent alternatives) by knowing the stored hash value. This may be used for assuring integrity of transmitted data.

In some embodiments of the present disclosure, a perfect hash function may be used. The perfect hash function may for example be a minimal perfect hash function. A perfect hash function for a set S is a hash function that maps distinct elements in S to a set of integers, with no collisions. A perfect hash function has many of the same applications as other hash functions, but with the advantage that no collision resolution has to be implemented. In mathematical terms, it is a total injective function. Furthermore, a perfect hash function is generally order preserving if the keys in the key set are arranged in some given order and the hash function typically preserves this order in the hash table. A perfect hash function for a specific set S that can be evaluated in constant time, and with values in a small range, can be found by a randomized algorithm in a number of operations that is proportional to the size of S. Any perfect hash functions suitable for use with a hash table typically use at least a number of bits that is proportional to the size of S. A perfect hash function with values in a limited range can be used for efficient lookup operations, by placing keys from S (or other associated values) in a table indexed by the output of the function. Using a perfect hash function is best in situations where there is a frequently queried large set, S, which is seldom updated. This is because any modification of the set leads to a non-perfect hash function. As is known among persons skilled in the art, a minimal perfect hash function (MPH function) is a perfect hash function that maps n keys to n consecutive integers, usually [0 . . . n−1] or [1 . . . n]. Or said differently: Let j and k be elements of some finite set K. F is a minimal perfect hash function if and only if F(j)=F(k) implies j=k (i.e., an injective function) and there exists an integer a such that the range of F is a . . . a+|K|−1. It has been proven that a general purpose minimal perfect hash scheme typically requires at least 1.44 bits/key. The best currently known minimal perfect hashing schemes appear to use around 2.6 bits/key.

A large advantage of using an MPH function as the chosen hash function in this context, apart from security, is that it provides an even distribution, so that the population of the second part of the temporary authentication value will not vary in size and thus have a predictable security level.

Figure 1:
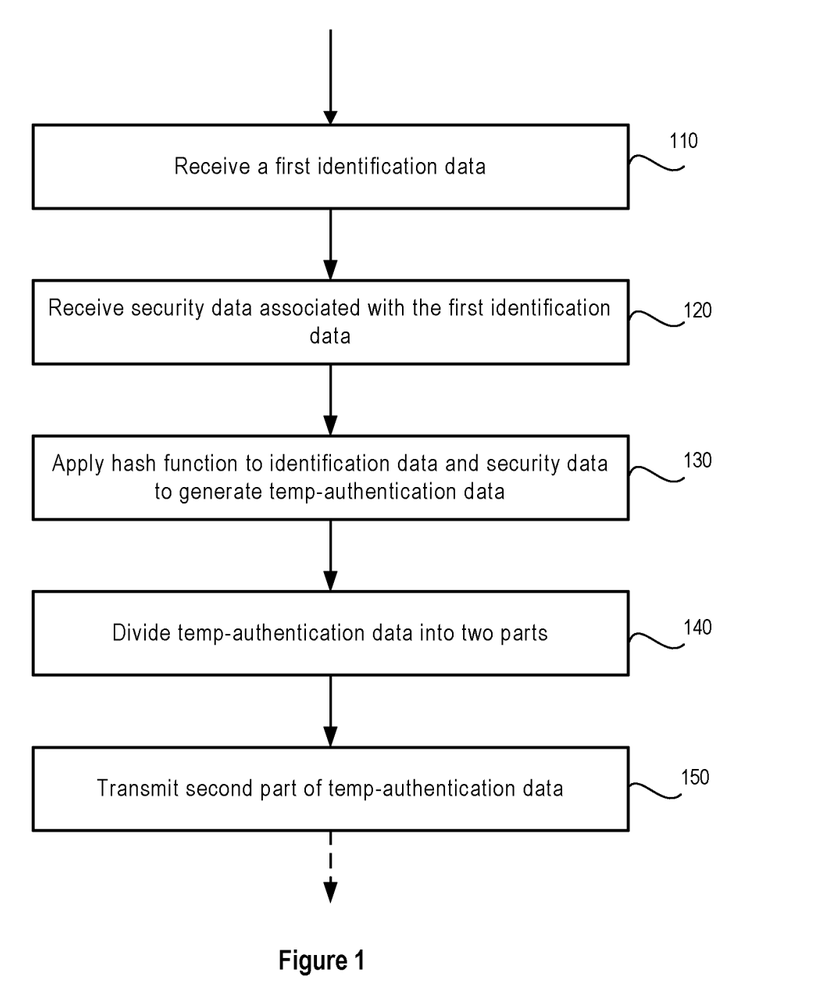
FIG. 1 is a flowchart illustrating method steps, or actions, in accordance with an embodiment of a method for generating a temporary authentication value.

FIG. 1 is a flowchart that schematically illustrates a method of generating a temporary authentication value, for use in a secure transmission to a service provider system having one or several computer servers. In the example detailed in FIG. 1, the method is performed by means of a terminal. The terminal may be, for example, a mobile telephone, a tablet computer, a laptop computer, a desktop computer, card terminal or an Automatic Teller Machine (ATM).

The method 100 starts at step 110 with receiving a first identification data. The first identification data may identify the terminal, the user operating the terminal or an item associated with the user operating the terminal. The first identification data may be, for example, a card number or a user name. As may be appreciated, the first identification data may comprise both letters and numbers, as well as other characters, in some cases. The method 100 thereafter continues with step 120 of receiving a security data associated with the first identification data. For example, if the first identification data is a card number, the security data may be a PIN code. In another example, if the first identification data is a user name, the security data may be a password. Accordingly, the security data is some kind of data that is linked to the first identification data that may be provided to verify that the user having access to the first identification data really is the one the user claims to be and authenticates the user. As may be appreciated, also the security data may comprise both letters and numbers as well as other characters.

Thereafter, the method 100 continues with step 130 of applying a hash function to the first identification data and the security data to generate a temporary authentication value. The generated temporary authentication value is temporary in the sense that it is not the original security data; it is a different value and it may alternatively be referred to as a replacement authentication value. The temporary authentication value replaces the security data temporarily, i.e. during the authentication process.

In step 140, the generated temporary authentication value is divided into a first and a second part. The first and the second part of the divided temporary authentication value may be of equal size. Alternatively, the first and the second part of the divided temporary authentication value may be of different sizes. The second part may be, for example, smaller than the first part of the divided temporary authentication value. Alternatively, the first part of the divided temporary authentication value may be smaller than the second part. Accordingly, the generated temporary authentication value may be divided into two different parts in any way as long as the second part of the divided temporary authentication value is smaller than the total size of the temporary authentication value. As appreciated from the above, the size of the second part will decide the percentage of matching authentication values. With a smaller second part, compared to the entire size of the temporary authentication value, the percentage of matching authentication values will be higher. With a larger second part, the percentage of matching authentication values will be lower. For example, if the second part would be of the same size as the entire temporary authentication data, there would only be one possible match. However, with a decreasing size of the second part, the numbers of possible matches will increase.

In step 150, the second part of the divided temporary authentication value is transmitted to the service provider system.

Figure 2A:
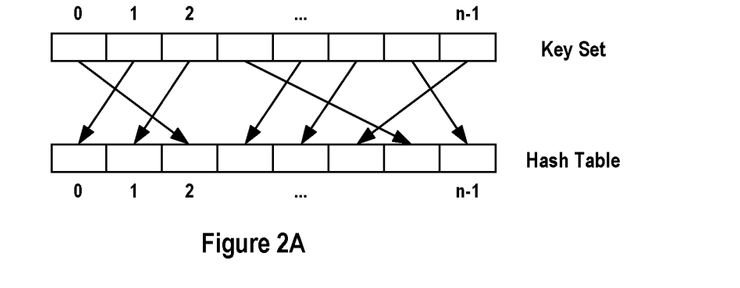
FIGS. 2A-2B schematically illustrate an example of a Minimal Perfect Hash (MPH) function.
Figure 2B:
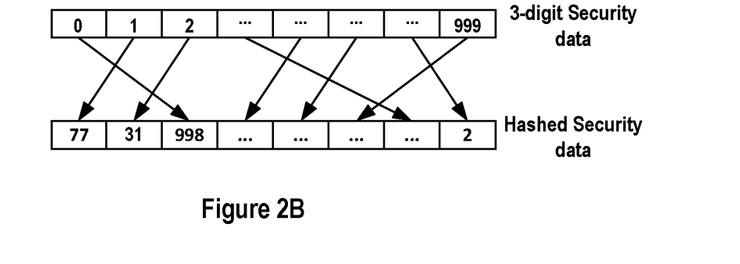

As described above, in some embodiments, the hash function may be an MPH function. An example of applying an MPH function to the first identification data and the security data, i.e. step 130, will now be described in more detail. FIG. 2A schematically illustrates an example minimal perfect hash function. MPH functions may avoid challenges of wasted space and time as is sometimes involved in other hash functions. Or said differently, each key in the key set has one and only one corresponding hashed key in the Hash Table. For example, assuming an application utilizing 3-digit security data, there will be 999 numbers in the Key Set and 999 corresponding numbers in the Hash Table. An example is given in FIG. 2B. In this example, there are 999 security data's and 999 corresponding hashed security data's. As can be seen, 0 renders 998, 1 renders 77, 2 renders 31, etcetera in this illustrative example.

The exact hash function, or hash algorithm, to be used in step 130 of applying a hash function may be arbitrarily, or randomly, determined or chosen. More specifically, the exact hash function, or hash algorithm, to be used in a certain implementation may be arbitrarily determined or chosen as long as it fulfills the requirements of a preferably non-order preserving, MPH function. As will be appreciated, the exact hash function, or hash algorithm, to be used should also be tested and evaluated in dependence of user needs and system requirements for the intended secure transmission. For example, the following webpage http://cmph.sourceforge.net/presents various publicly available hash functions that may be used in dependence of, for instance, user needs and system requirements (e.g., central processing unit (CPU) capacity and memory requirements). In some implementations, applications, or scenarios, it has turned out that the CHD function (abbreviation for Compress, Hash and Displace) may be advantageous. The CHD function is described in detail in the paper "Hash, displace, and compress" by Djamal Belazzougui, Fabiano C. Botelho, and Martin Dietzfelbinger, which can be downloaded here: http://cmph.sourceforge.net/papers/esa09.pdf. Alternatively, it has turned out that BDZ or BMZ functions described at the webpage http://cmph.sourceforge.net/may be suitable to apply.

In some embodiments, the step 130 of applying a hash function may additionally comprise applying the hash function to a data seed. The data seed may include a time stamp and/or an identifier such as a mobile terminal identifier (e.g., an IMSI). By using a time stamp, the method would provide a temporary authentication value, which is valid only for a limited period of time, e.g. using a data seed containing a timestamp when generating it. By also including a data seed, the generated temporary authentication value may be even more dynamic and become even more difficult to obtain fraudulently. However, these embodiments may be hard to use in combination with permanent verification lists.

In alternative embodiments, method steps (or, actions) 110-140 and method step (or, action) 150 may be performed, or otherwise executed, by different devices in a distributed manner. For instance, a first device, or terminal, may initially generate the divided temporary authentication value and divide it into a first and a second part. Thereafter, a second (i.e. a different) device, or terminal, may transmit the generated divided temporary authentication value to the service provider system. In one example embodiment, the first device may e.g. be a temporary authentication value generation device, which is specifically designed for generating the divided temporary authentication value. Once known, the divided temporary authentication value generated by the first device may be utilized by a second device for being transmitted to the service provider system, for example to initiate an authorization process or a card based transaction.

Figure 3:
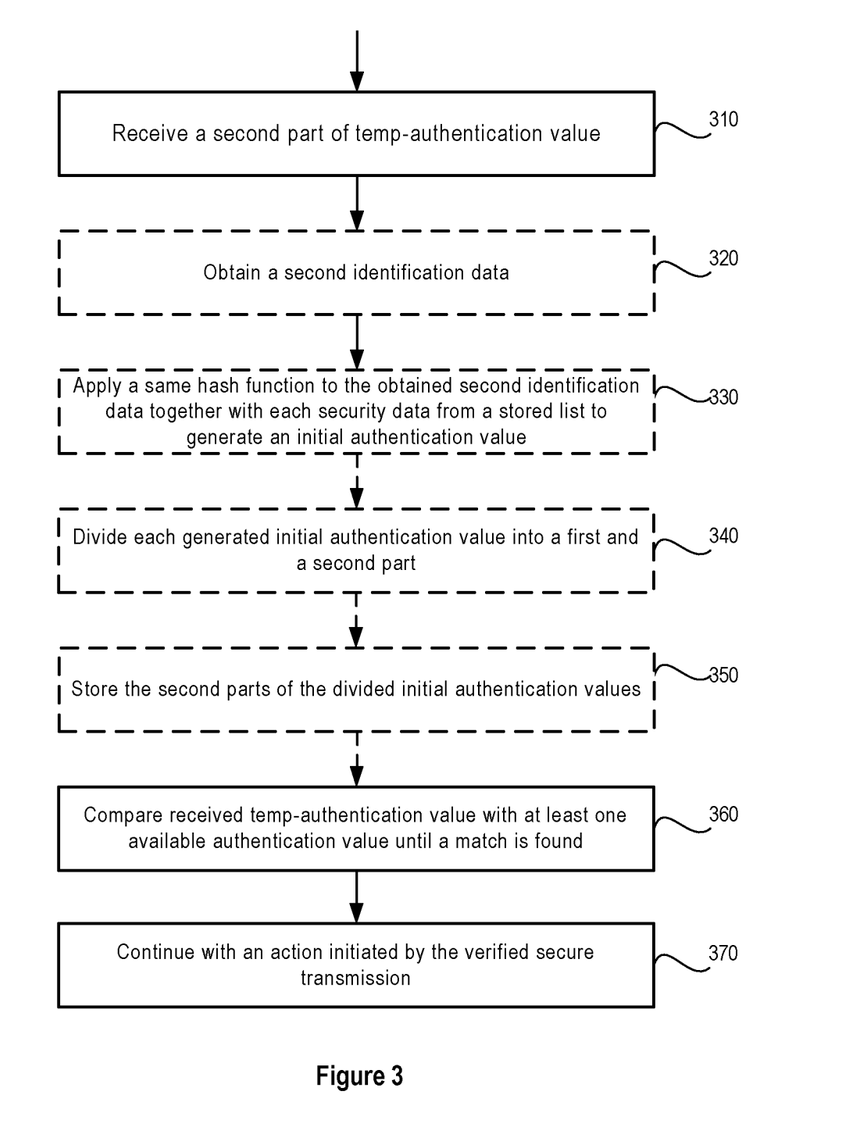
FIG. 3 is a flowchart illustrating method steps, or actions, in accordance with an embodiment of a method for verifying a second part of a temporary authentication value.

Reference is now made to FIG. 3, which illustrates a flowchart that schematically illustrates a method of verifying a second part of a temporary authentication value used in a secure transmission. In the example detailed in FIG. 3, the method is performed by means of a service provider system including one or several computer servers. In alternative embodiments, the method may e.g. instead be performed by means of credit issuer system including one or several computer servers.

As will be appreciated, the service provider system may comprise one single service provider server or several service provider servers. To this end, the expression service provider server is used to mean a computer server hosted by a service provider.

The method 300 starts at step 310 with receiving the second part of the temporary authentication value. As been previously described with reference to FIG. 1, the second part of the divided temporary authentication value has been generated by previously applying a hash function to a first identification data and a security data to generate a temporary authentication value. As previously described, the applied hash function may be any suitable hash function, but in one preferred embodiment, the hash function may be an MPH function. Thereafter, the temporary authentication value is divided into a first and a second part. For example, the second part of the temporary authentication value may be received from a terminal, e.g. a mobile terminal, which has transmitted the second part of the temporary authentication value to the service provider system. For example, the terminal may have transmitted the second part of the temporary authentication value to initiate an authentication process or card based transaction with the service provider system.

Furthermore, the method 300 comprises step 360 of comparing the received second part of the temporary authentication value with each one of at least one available authentication value until a match is found between the received second part of the temporary authentication value and one authentication value.

Accordingly, if the received second part of the temporary authentication value matches an, at the service provider system, available authentication value, the first identification data is authenticated. In one embodiment, the service provider system only has one available authentication value. Thus, the received second part of the temporary authentication value has to match that value in order for the first identification data to be authenticated.

In some embodiments, the at least one authentication value may be stored in a list of available authentication values. This may be applicable in cases when the hash function has been applied only to static values, e.g. the first identification data and the security data, or when e.g. the second part of the temporary authentication value is larger than the first part. The list of available authentication values comprises at least one available authentication value. As is appreciated, the numbers of authentication values stored in the list may be a single value or may be multiple values.

In some other embodiments, the method 300 may further comprise step 320 of obtaining a second identification data. The obtained second identification data is a same identification data as the first identification data. The method 300 may further comprise the step 330 of applying a same hash function to the obtained second identification data together with each one of several security data from a stored list of available security data to generate an initial authentication value. Thereafter, the method 300 continues with step 340 of dividing each generated initial authentication value into a first and a second part. Each second part of the generated initial authentication values may correspond to an available authentication value. Thus, the method 300 comprises a continued comparison of the received second part of the authentication value with the generated divided initial authentication values until a match is found. This may provide a secure transmission of the security data, which will be authenticated in a less complex, but still secure way. It may be very difficult, if not impossible, for a fraudster to create a "false" valid temporary authentication value.

In the previous described embodiments, the applied hash function may additionally be applied to a data seed. In such embodiments, the hash function will be applied to the same data seed at both the terminal and the service provider system. The data seed may include a time stamp and/or an identifier such as a mobile terminal identifier (e.g., an IMSI). By using a time stamp, the method would provide a temporary authentication value, which is valid only for a limited period of time, e.g. using a data seed containing a timestamp when generating it. By also including a data seed, the method 300 may become even more difficult to obtain fraudulently.

In one embodiment, the method 300 may further comprise step 350 of storing the second parts of the divided initial authentication value as authentication values in a list of available authentication values. Accordingly, a list with divided authentication values are stored in a list at the verifying party, i.e. the service provider system. When a service provider system receives the transmitted second part of the temporary authentication value, it may compare the value with authentication values stored in the list at the service provider system. If there is a match, the first identification data may be authenticated, if no match is found, the first identification data may not be authenticated.

In advantageous embodiments, in response to a match having been found, the method 300 may further comprise the step 370 of continuing with an action initiated by the verified secure transmission. The initiated action may be, for example, an authentication process or a card based transaction.

Figure 4A:
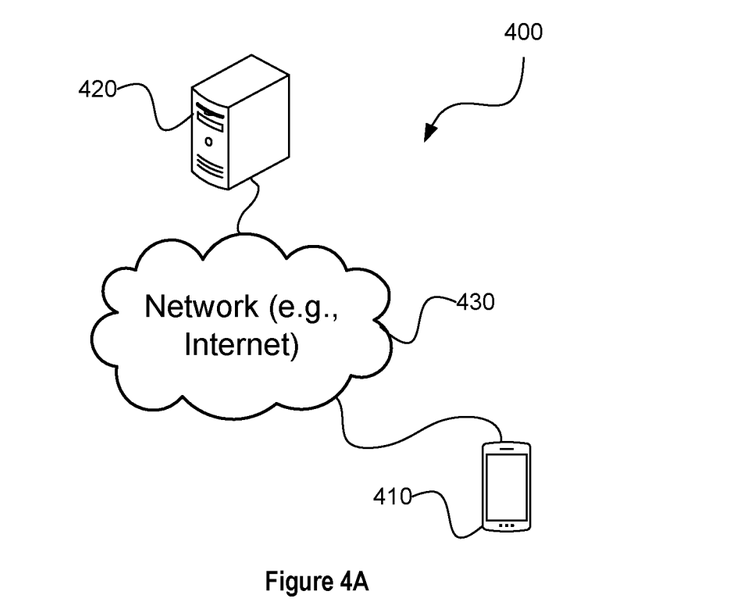
FIG. 4A is a block diagram of a system where embodiments described herein are shown schematically.
Figure 4B:
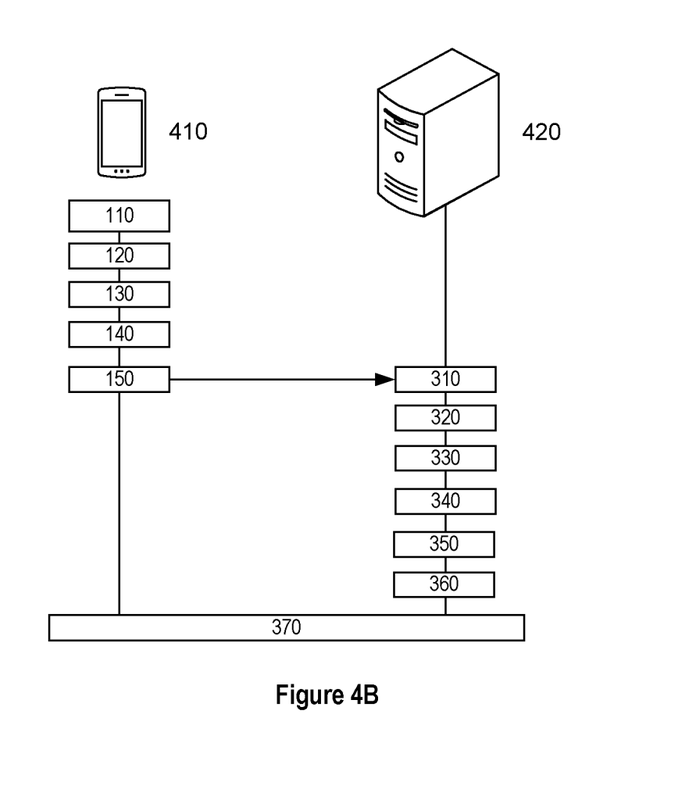
FIG. 4B is a signaling diagram schematically illustrating actions performed in the system of FIG. 4A, in accordance with some embodiments.

FIG. 4A schematically illustrates a system, wherein embodiments described hitherto may be applied. In this example scenario, the system 400 comprises a terminal 410, here illustrated as a mobile telephone, and a service provider system 420, such as a computer server hosted by a service provider. FIG. 4B is a signaling diagram illustrating various actions that may be performed as well as signaling between the mobile terminal 410 and the service provider system 420 shown in FIG. 4A.

The terminal 410 may be connected through a network or other connection 430, in one example via the internet. The terminal 410 may be connected through a wired connection, a wireless connection, or any combination of known connection methods for example through dedicated networks or connections. It should be noted that any terminal may be connected to the network 430 and the number and type of terminals 410 in FIG. 4A should not be construed as limiting. The system 400 further comprises at least one server 420. In FIG. 4A only one server 420 is shown, but it should be noted that any number of servers 420 may be implemented in a computer network. Generally a server is a physical computer (a hardware system) dedicated to running one or more services (as a host), to serve the needs of users of other computers or terminals 410 on the network 430. In one embodiment, the server 420 is a service provider server. Generally, a service provider server 420 may refer to either hardware (a computer) or software (a computer application) that helps to deliver content that can be accessed through a mutual communication network, such as the Internet 430.

FIG. 4B shows example actions and example messages that may be signaled between a terminal 410 and a service provider system 420 to perform a secure transmission of authentication values. As described earlier, the terminal, here exemplified as a mobile telephone, receives 110 a first identification data. The terminal 410 further receives 120 a security data associated with the first identification data. The terminal 410 applies 130 a hash function, e.g. a minimal perfect hash, to the first identification data and the security data to generate a temporary authentication value. The generated temporary authentication value is divided 140 into a first and a second part. The terminal 410 transmits 150 the second part of the divided temporary authentication value to the service provider system. The service provider system 420 receives 310 said second part of the temporary authentication value. For example, the service provider system 420 may receive the second part of the temporary authentication value from the terminal 410. In response to receiving 310 the second part of the temporary authentication value, the service provider server 420 may further compare the received second part of the temporary authentication value with each one of at least one available authentication value until a match is found between the received second part of the temporary authentication value and one authentication value.

As will be appreciated, a temporary authentication value may be generated at the mobile terminal 410. The temporary authentication value may be, according to some embodiments, valid only for a limited period of time. By also adding the application of a hash function to the first identification data and the security data as well as a data seed, it is made possible to generate a momentarily temporary authentication value. The data seed may include, for example, a time stamp and/or an identifier such as an IMSI. The data seed may be obtained in different ways, e.g., depending on characteristics of the intended action to be initiated by the authentication of the first identification data. In some embodiments, the data seed may be obtained in a way where the user provides the data seed to the terminal executing the method. Additionally, or alternatively, obtaining the data seed may comprise receiving a signal including the data seed from the service provider system having one or several computer servers. For example, an installation-ID may be included in a signal received from the service provider system. Additionally, or alternatively, obtaining the data seed comprises receiving a signal including the data seed from a card issuer system having one or several computer servers. For instance, a bank account number may be included in a signal received from the card issuer system. Additionally, or alternatively, obtaining the data seed may comprise retrieving the data seed from a SIM associated with the mobile terminal. For example, an IMSI may be retrieved from said SIM. The momentarily temporary authentication value is generally even more difficult to obtain fraudulently.

Figure 5:
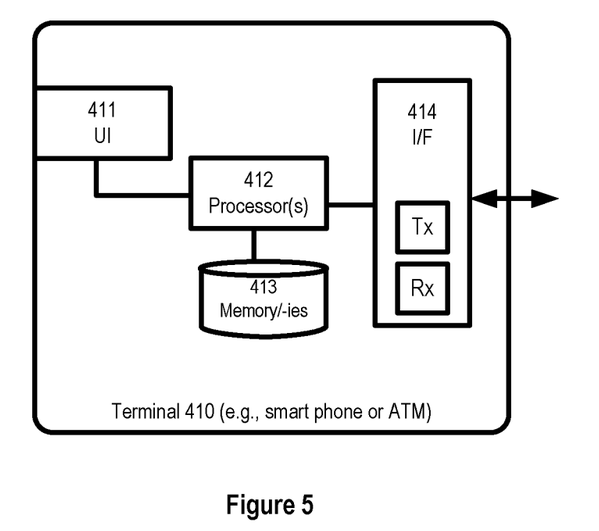
FIG. 5 shows an example implementation of an embodiment of a terminal.

Reference is now made to FIG. 5 which schematically illustrates an example implementation of an embodiment of a terminal 410 (see, e.g., also FIGS. 4A-4B). The terminal 410 may be, for example, a mobile telephone, a tablet computer, a laptop computer, a desktop computer, or card terminal. The terminal 410 may be configured to perform, or otherwise execute, the method in accordance with any one of the embodiments described herein, e.g. FIG. 1 or FIGS. 4A-4B. To this end, the terminal 410 comprises a user interface (UI) 411. The mobile terminal 410 also comprises hardware resources. For example, the mobile terminal 410 may comprise one or more processors 412 and one or more memories 413. In addition, a communications interface 414, or a communications circuitry, may be provided in order to allow the mobile terminal to communicate with other devices such as a service provider system 420. To this end, the communications interface 414 may comprise a transmitter (Tx) and a receiver (Rx). Alternatively, the communications interface 414 may comprise a transceiver (Tx/Rx) combining both transmission and reception capabilities. The communications interface 414 may include a radio frequency (RF) interface allowing the mobile terminal 410 to communicate with other mobile terminals and/or devices such as the service provider system 420 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera.

As will be appreciated, the terminal 410 may hence comprise a UI 411, a communications interface I/F 414, one or more processors 412; and memory 413 storing instructions, executable by the one or more processors 412, whereby the terminal 410 is operative to receive a first identification data, receive a security data associated with the first identification data, apply a hash function to the first identification data and the security data to generate a temporary authentication value, divide the generated temporary authentication value into a first and a second part and transmit the second part of the divided temporary authentication value to the service provider system 420.

In some embodiments, the hash function may be an MPH function.

In some embodiments, the first identification data may be a card number. Then, the security data may be a PIN code.

In some embodiments, the first identification data may be a user name. Then, the security data may be a password.

In some embodiments, the first and the second parts of the divided temporary authentication value may be of equal size. In other embodiments, the first and the second part of the divided temporary authentication value may be of different sizes. The second part may be, for example, smaller than the first part of the divided temporary authentication value. Alternatively, the first part of the divided temporary authentication value may be smaller than the second part.

Figure 6:
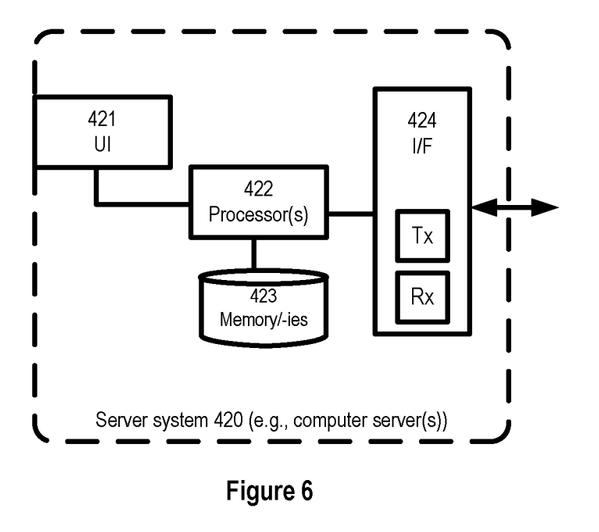
FIG. 6 shows an example implementation of an embodiment of a server system such as a service provider system.

Reference is now made to FIG. 6 which schematically illustrates an example implementation of an embodiment of a service provider system 420 (see, e.g., also FIGS. 4A-4B). The service provider system 420 may, for example, computer server hosted by a service provider as described earlier. The service provider system 420 may be configured to perform, or otherwise execute, the method in accordance with any one of the embodiments described herein, e.g. FIG. 3 or FIG. 4. To this end, the service provider system 420 may optionally comprise a UI 421. Furthermore, the service provider system 420 comprises hardware resources. For example, the service provider system 420 may comprise one or more processors 422 and one or more memories 423. Also, a communications interface 424, or a communications circuitry, may be provided in order to allow the service provider system 420 to communicate with other devices such as a mobile terminal 410. To this end, the communications interface 424 may comprise a transmitter (Tx) and a receiver (Rx). Alternatively, the communications interface 424 may comprise a transceiver (Tx/Rx) combining both transmission and reception capabilities. The communications interface 424 may include a radio frequency (RF) interface allowing the service provider system 420 to communicate with other computer servers and/or devices such as the mobile terminal 410 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera.

As will be appreciated, the service provider system 420 may hence comprise a communications interface 424, one or more processors 422 and memory 423 storing instructions, executable by the one or more processors, whereby the service provider server 420 is operative to receive the second part of the temporary authentication value. The second part of the divided temporary authentication value has been generated by previously applying a hash function to a first identification data and a security data to generate a temporary authentication value and then dividing the temporary authentication value into a first and the second part. The service prover server 420 is further operative to compare the received second part of the temporary authentication value with each one of at least one available authentication value until a match is found between the received second part of the temporary authentication value and one authentication value.

In some embodiments, the at least one authentication value may be stored in a list of available authentication values.

In some other embodiments, the service provider server may further be operable to obtain a second identification data, the second identification data being a same identification data as the first identification data; and apply a same hash function to the obtained second identification data together with each one of several security data from a stored list of available security data to generate an initial authentication value. Thereafter, the service provider system may be operable to divide each generated initial authentication value into a first and a second part; and store the second parts of the divided initial authentication value as authentication values in a list of available authentication values.

In advantageous embodiments, the service provider system may further be operable to, in response to a match having been found, continue with an action initiated by the verified secure transmission.

In some embodiments, the hash function may be an MPH function.

Figure 7:
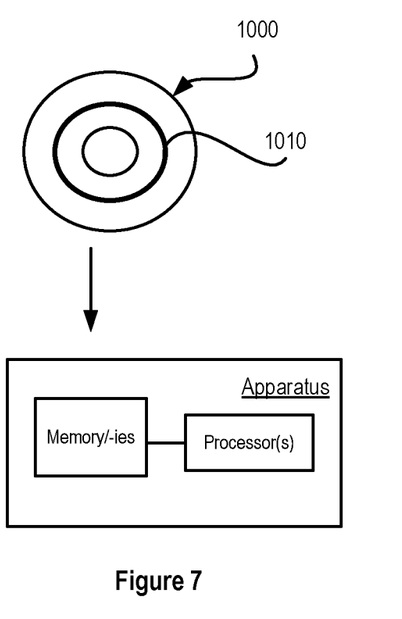
FIGS. 7-8 illustrate carriers comprising a computer program, in accordance with embodiments.

Turning now to FIG. 7, another embodiment will be briefly discussed. FIG. 7 shows an example of a computer-readable medium, in this example in the form of a data disc 1000. In one embodiment the data disc 1000 is a magnetic data storage disc. The data disc 1000 is configured to carry instructions 1010 that can be loaded into a memory of an apparatus, e.g. the mobile terminal 410. Upon execution of said instructions by a processor of the apparatus, the apparatus is caused to execute a method or procedure according to any one of the embodiments described herein, e.g. in conjunction with FIGS. 1 and 4. The data disc 1000 is arranged to be connected to or within and read by a reading device (not shown), for loading the instructions into the processor. One such example of a reading device in combination with one (or several) data disc(s) 1000 is a hard drive. It should be noted that the computer-readable medium could also be other mediums such as compact discs, flash memories or other memory technologies commonly used. In such an embodiment the data disc 1000 is one type of a tangible computer-readable medium. The instructions may alternatively be downloaded to a computer data reading device, such as an apparatus capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

Figure 8:
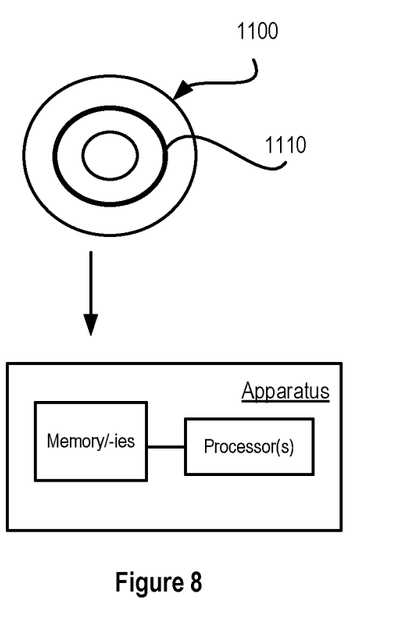

Turning now to FIG. 8, another embodiment will be briefly discussed. FIG. 8 shows an example of a computer-readable medium, in this example in the form of a data disc 1100. In one embodiment the data disc 1100 is a magnetic data storage disc. The data disc 1100 is configured to carry instructions 1110 that can be loaded into a memory of an apparatus, e.g. a service provider system 420 including one or several computer servers. Upon execution of said instructions by a processor of the apparatus, the apparatus is caused to execute a method or procedure according to any one of the embodiments described herein, e.g. in conjunction with FIGS. 3 and 4. The data disc 1100 is arranged to be connected to or within and read by a reading device (not shown), for loading the instructions into the processor. One such example of a reading device in combination with one (or several) data disc(s) 1100 is a hard drive. It should be noted that the computer-readable medium could also be other mediums such as compact discs, flash memories or other memory technologies commonly used. In such an embodiment the data disc 1100 is one type of a tangible computer-readable medium. The instructions may alternatively be downloaded to a computer data reading device, such as an apparatus capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the apparatus. In such an embodiment, the computer-readable signal is one type of a non-tangible computer-readable medium.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes, which may be substantially represented in computer readable medium and so executed by a computer or processor, whether or not such computer or processor is explicitly shown. The functions of the various elements including functional blocks may be provided with hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer, processor, or controller, the functions may be provided by a single dedicated computer, processor or controller, by a single shared computer, processor or controller, or by a plurality of individual computers, processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. For example, while the embodiments described herein have been exemplified to apply, or make use of, minimal perfect hash functions, persons that are skilled in the art will appreciate that it is not necessary to apply, or make use of, minimal perfect hash functions. It will be envisaged that, in some applications or scenarios, other hash functions may alternatively be applied. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method of generating a temporary authentication value, for use in a secure transmission to a service provider system having one or several computer servers, wherein the method is performed by a terminal, the method comprising:
   receiving, by the terminal, first identification data associated with the terminal, an item, or a user;
   receiving, by the terminal, security data associated with the first identification data;
   applying, by the terminal, a hash function to the first identification data and the security data to generate a temporary authentication value;
   dividing, by the terminal, the generated temporary authentication value into a first part and a second part; and
   transmitting, by the terminal, only the second part of the divided temporary authentication value to the service provider system, wherein the second part of the divided temporary authentication value is configured to be used for authentication of the terminal, the item, or the user.

2. The method of claim 1, wherein the hash function is a Minimal Perfect Hash (MPH) function.

3. The method of claim 1, wherein the first identification data is a card number.

4. The method of claim 3, wherein the security data is a PIN code.

5. The method of claim 1, wherein the first identification data is a user name.

6. The method of claim 5, wherein the security data is a password.

7. The method of claim 1, wherein the first part of the divided temporary authentication value and the second part of the divided temporary authentication value are of equal size.

8. The method of claim 1, wherein the first part of the divided temporary authentication value and the second part of the divided temporary authentication value are of different sizes.

9. The method of claim 8, wherein the second part of the divided temporary authentication value is smaller than the first part of the divided temporary authentication value.

10. The method of claim 8, wherein the first part of the divided temporary authentication value is smaller than the second part of the divided temporary authentication value.

11. The method of claim 1, wherein the terminal is a device selected from a group comprising: a mobile telephone, a tablet computer, a laptop computer, a desktop computer, card terminal and an Automatic Teller Machine (ATM).

12. A method of verifying a second part of a divided temporary authentication value used in a secure transmission, wherein the method is performed by a service provider system having at least one computer server, the method comprising:
   receiving, by the service provider system, the second part of the divided temporary authentication value, wherein the second part of the divided temporary authentication value has been generated by previously applying a hash function to first identification data, associated with a terminal, an item, or a user, and security data to generate a temporary authentication value and then dividing the temporary authentication value into a first part and the second part;

comparing, by the service provider system, the received second part of the divided temporary authentication value with each one of at least one available authentication value until a match is found between the received second part of the divided temporary authentication value and one authentication value, wherein the service provider system authenticates the terminal, the item, or the user using the received second part of the divided temporary authentication value; and in response to the match having been found, continuing, by the service provider system, with an action initiated by the secure transmission.

13. The method of claim 12, wherein the at least one available authentication value is stored in a list of available authentication values.

14. The method of claim 12, wherein the method further comprises:

obtaining second identification data, the second identification data corresponding the first identification data;

applying the hash function to the obtained second identification data together with each security data from a stored list of available security data to generate one or more initial authentication values; and dividing each of the generated one or more initial authentication values into a first part and a second part, wherein each second part of the generated one or more initial authentication values corresponds to an available authentication value.

15. The method of claim 14, wherein the method further comprises storing the available authentication value in a list of available authentication values.

16. The method of claim 12, wherein the hash function is a Minimal Perfect Hash (MPH) function.

17. A computer program comprising instructions which, when executed on a processor, causes the processor to carry out the method according to claim 1.

18. A non transient computer readable medium comprising the computer program of claim 17.

19. A terminal, comprising:
a user interface;
a communications interface;
one or more processors; and
a memory storing instructions, executable by the one or more processors, whereby the terminal is operative to perform the method of claim 1.

20. The terminal of claim 19, wherein the terminal is a device selected from a group comprising: a mobile telephone, a tablet computer, a laptop computer, a desktop computer, card terminal, and an Automatic Teller Machine (ATM).

21. A service provider system having one or several computer servers, the system comprising:
a communications interface;
one or more processors; and
a memory storing instructions, executable by the one or more processors, whereby the service provider system is operative to perform the method of claim 12.

22. A method for a secure transmission between a terminal and a service provider system having one or several computer servers, the method comprising:

receiving, by the terminal, a first identification data associated with the terminal, an item, or a user;

receiving, by the terminal, a security data associated with the first identification data;

applying, by the terminal, a hash function to the first identification data and the security data to generate a temporary authentication value;

dividing, by the terminal, the generated temporary authentication value into a first part and a second part;

transmitting, by the terminal, only the second part of the divided temporary authentication value to the service provider system;

receiving, by the service provider system, said second part of the divided temporary authentication value;

comparing, by the service provider system, the received second part of the divided temporary authentication value with each one of at least one available authentication value until a match is found between the received second part of the divided temporary authentication value and one authentication value, wherein the service provider system authenticates the terminal, the item, or the user using the received second part of the divided temporary authentication value; and in response to the match having been found, continuing, by the service provider system, with an action initiated by the secure transmission.

23. A system for a secure transmission, the system comprising:
a terminal; and
a service provider system having one or several computer servers,
wherein the terminal is configured to:
receive, by the terminal, a first identification data associated with the terminal, an item, or a user;
receive, by the terminal, a security data associated with the first identification data;
apply, by the terminal, a hash function to the first identification data and the security data to generate a temporary authentication value;
divide, by the terminal, the generated temporary authentication value into a first part and a second part; and
transmit, by the terminal, only the second part of the divided temporary authentication value to the service provider system, and
wherein the service provider system is configured to:
receive, by the service provider system, the second part of the divided temporary authentication value;
compare, by the service provider system, the received second part of the divided temporary authentication value with each one of at least one available authentication value until a match is found between the received second part of the divided temporary authentication value and one authentication value, wherein the service provider system authenticates the terminal, the item, or the user using the received second part of the divided temporary authentication value; and
in response to the match having been found, continue, by the service provider system, with an action initiated by the secure transmission.

* * * * *